United States Patent
Ti et al.

(10) Patent No.: US 12,344,739 B2
(45) Date of Patent: Jul. 1, 2025

(54) CONDUCTIVE EPOXY RESIN COMPOSITION FOR COPPER BONDING

(71) Applicant: Henkel AG & Co. KGaA, Duesseldorf (DE)

(72) Inventors: Yang Ti, Shanghai (CN); Wei Yao, Shanghai (CN); Qili Wu, Shanghai (CN); Jiawen Zhao, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 26 days.

(21) Appl. No.: 18/096,648

(22) Filed: Jan. 13, 2023

(65) Prior Publication Data

US 2023/0174773 A1  Jun. 8, 2023

Related U.S. Application Data

(63) Continuation-in-part of application No. PCT/CN2020/101576, filed on Jul. 13, 2020.

(51) Int. Cl.
*H01B 1/22* (2006.01)
*C08L 63/00* (2006.01)

(52) U.S. Cl.
CPC ............ *C08L 63/00* (2013.01); *H01B 1/22* (2013.01); *C08L 2203/20* (2013.01)

(58) Field of Classification Search
CPC .... H01B 1/00; H01B 1/20; H01B 1/22; C08L 63/00; C08K 2201/001
See application file for complete search history.

(56) References Cited

U.S. PATENT DOCUMENTS

| | | | | |
|---|---|---|---|---|
| 9,303,116 | B2 * | 4/2016 | Kumamoto | ............ C08G 59/54 |
| 11,760,711 | B2 * | 9/2023 | Arita | ............ C09J 163/00 |
| | | | | 428/344 |
| 2010/0076119 | A1 | 3/2010 | Ishizawa et al. | |
| 2017/0158807 | A1 * | 6/2017 | Yoshimoto | ............ C08K 9/08 |

FOREIGN PATENT DOCUMENTS

| | | |
|---|---|---|
| CN | 101679605 A | 3/2010 |
| CN | 102471455 A | 5/2012 |
| CN | 103224608 A | 7/2013 |
| CN | 107586520 | 1/2018 |
| CN | 109913080 | 6/2019 |
| CN | 111087843 | 5/2020 |
| EP | 2108688 A1 | 10/2009 |
| JP | 2009084510 A | 4/2009 |
| TW | 200831627 A | 8/2008 |
| WO | 03040251 | 5/2003 |
| WO | 2008084843 A1 | 7/2008 |
| WO | 2008127556 A1 | 10/2008 |
| WO | 2011008295 | 1/2011 |
| WO | 2019218268 A1 | 11/2019 |
| WO | WO 2021/100641 A1 * | 5/2021 |

OTHER PUBLICATIONS

Inoue et al "In-situ Analysis of Electrical Conductivity Evolution in Epoxy-based Conductive Adhesives with Ag Loading during Curing Process", IEEE CPMT Symposium Japan 2014, 2014•ieeexplore.ieee.org.*
Zhao et al "Epoxy-Based Adhesives Filled With Flakes Ag-Coated Copper as Conductive Fillers", Polymer Composites—2017 , DOI 10.1002/pc.23645.*
Rabilloud "12 Adhesives for Electronics", Handbook of Adhesives and Surface Preparation, ed. Sina Ebnesajjad. DOI: 10.1016/B978-1-4377-4461-3.10012-4.*
English language machine translation of CN 107586520 (pub date Jan. 2018).*
English language form PCT/ISA/237 (mail date Apr. 9, 2021).*
PCT International Search Report—WO PCT/CN2020/101576—Mailing date: Apr. 12, 2021.

* cited by examiner

*Primary Examiner* — Mark Kopec
(74) *Attorney, Agent, or Firm* — Steven C. Bauman

(57) ABSTRACT

This invention relates to a conductive epoxy resin composition, in particular for bonding copper substrate, and the cured product, and the use thereof as well as a semiconductor device comprising the cured product.

16 Claims, No Drawings

CONDUCTIVE EPOXY RESIN COMPOSITION FOR COPPER BONDING

TECHNICAL FIELD

The present invention relates to a conductive epoxy resin composition, in particular for bonding copper substrate, and the cured product, and the use thereof as well as a semiconductor device comprising the cured product.

BACKGROUND OF THE INVENTION

Conductive epoxy resin adhesives are used for a variety of purposes in the fabrication and assembly of semiconductor packages, such as, the bonding of integrated circuit chips to lead frames or other substrates. It is important that the cured adhesives demonstrate high adhesion, high thermal conductivity, high moisture resistance, good temperature stability and good reliability.

Conventional one-part conductive epoxy resin adhesives typically include conductive filler, epoxy resins and curing agent. Epoxy resins, however, can be brittle, and other resins have been evaluated and employed to bring flexibility, hydrophobicity and other properties to die attach adhesive. Particularly, conductive epoxy resin adhesives do not display strong adhesion to copper substrate, especially at high temperature, e.g. above 260° C.

Consequently, there remains a need to develop a conductive epoxy resin adhesive which is capable of bonding copper substrate with good adhesion at high temperature, especially above 260° C.

SUMMARY OF THE INVENTION

After intensive studies, the inventors have found that the above problem can be solved by a conductive epoxy resin composition comprising:
- (A) at least one epoxy resin system comprising (A1) at least one epoxy resin having at least two glycidyloxy group-containing aromatic groups bonded to each other by a divalent endocyclic hydrocarbon group or an aryl group, and optionally a $C_1$ to $C_6$ alkylene group; and (A2) at least one resorcinol diglycidyl ether resin present in an amount of from 0.2 to 5.0%, based on the total weight of the composition;
- (B) at least one acid anhydride curing agent;
- (C) optionally, at least one solvent;
- (D) at least one conductive filler; and
- (E) optionally, at least one catalyst.

In another aspect of the invention, a cured product of the conductive epoxy resin composition according to this invention is provided.

In an additional aspect of the invention, a semiconductor device comprising the cured product of the conductive adhesive according to this invention is provided.

In yet another aspect of the invention, the use of the conductive epoxy resin composition and cured product of the conductive epoxy resin composition in the manufacturing of semiconductor packages or microelectronic devices is provided.

DETAILED DESCRIPTION OF THE INVENTION

It is to be understood by one of ordinary skill in the art that the present invention is a description of exemplary embodiments only and is not intended as limiting the broader aspects of the present invention. Each aspect so described may be combined with any other aspect or aspects unless clearly indicated to the contrary. In particular, any feature indicated as being preferred or advantageous may be combined with any other feature or features indicated as being preferred or advantageous.

Unless specified otherwise, in the context of the present invention, the terms used are to be construed in accordance with the following definitions.

Unless specified otherwise, as used herein, the terms "a", "an" and "the" include both singular and plural referents.

The terms "comprising" and "comprises" as used herein are synonymous with "including", "includes" or "containing", "contains", and are inclusive or open-ended and do not exclude additional, non-recited members, elements or process steps.

Unless specified otherwise, the recitation of numerical end points includes all numbers and fractions subsumed within the respective ranges, as well as the recited end points.

All references cited in the present specification are hereby incorporated by reference in their entirety.

Unless otherwise defined, all terms used in the present invention, including technical and scientific terms, have the meaning as commonly understood by one of the ordinary skilled in the art to which this invention belongs.

The present invention is directed to a conductive epoxy resin composition comprising:
- (A) at least one epoxy resin system comprising (A1) at least one epoxy resin having at least two glycidyloxy group-containing aromatic groups bonded to each other by a divalent endocyclic hydrocarbon group or an aryl group, and optionally a $C_1$ to $C_6$ alkylene group; and (A2) at least one resorcinol diglycidyl ether resin present in an amount of from 0.2 to 5.0%, based on the total weight of the composition;
- (B) at least one acid anhydride curing agent;
- (C) optionally, at least one solvent;
- (D) at least one conductive filler; and
- (E) optionally, at least one catalyst.

Epoxy Resin System

According to the present invention, one notable feature is that the epoxy resin system (A) contained in conductive epoxy resin composition comprises (A1) at least one epoxy resin having at least two glycidyloxy group-containing aromatic groups bonded to each other by a divalent endocyclic hydrocarbon group or an aryl group, and optionally a $C_1$ to $C_6$ alkylene group; and (A2) at least one resorcinol diglycidyl ether resin present in an amount of from 0.2 to 5.0% by weight, based on the total weight of the composition, which dramatically improves adhesion on bonding copper substrate at high temperature.

(A1) Epoxy Resin

According to the present invention, the epoxy resin (A1) has at least two glycidyloxy group-containing aromatic groups bonded to each other by a divalent endocyclic hydrocarbon group or an aryl group, and optionally a $C_1$ to $C_6$ alkylene group.

The glycidyloxy group-containing aromatic groups can have various structures including but not limited to monofunctional glycidyloxy group-containing phenol, multifunctional glycidyloxy group-containing phenol, monofunctional glycidyloxy group-containing naphthalene group, multifunctional glycidyloxy group-containing naphthalene group, and combination thereof. Specific examples can be represented by structural formulae Ep1 to Ep9 as below:

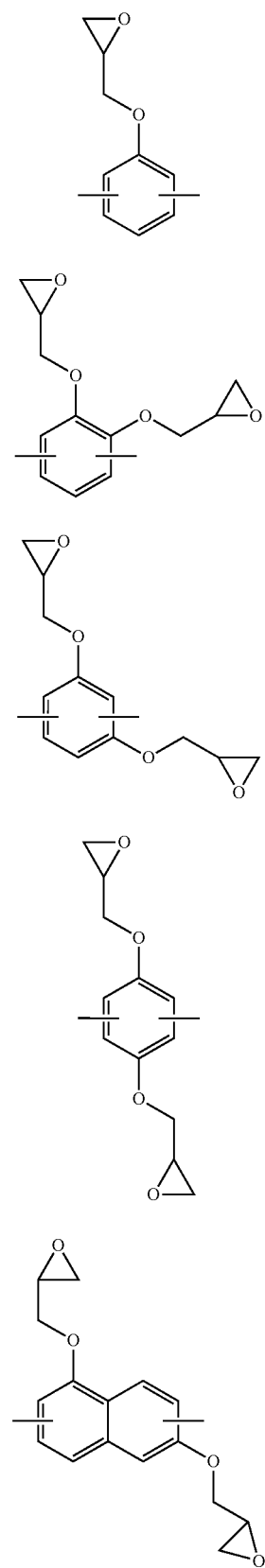

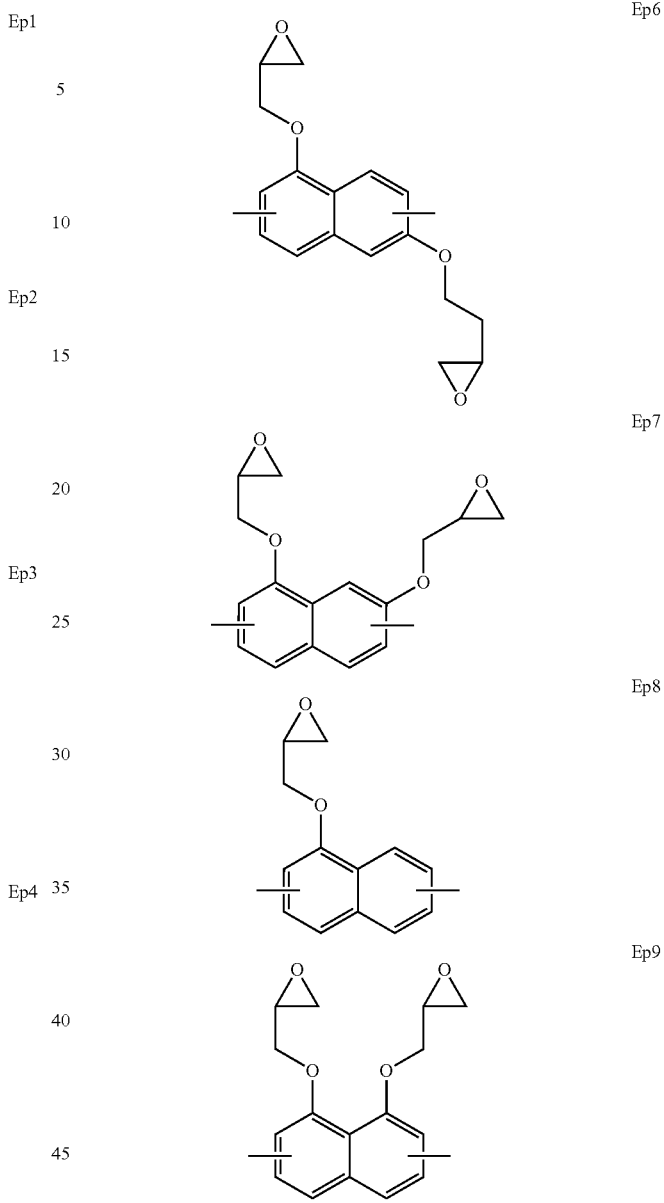

In the present invention, the glycidyloxy group-containing aromatic group is not limited to the above structure formula from Ep1 to Ep9. In other embodiments, the glycidyloxy group-containing aromatic group can be triglycidyl or tetraglycidyl group-containing phenol or naphthalene group.

In these above structures, when two or more linkages to other structural sites are positioned on a naphthalene group, these bonds may be positioned on the same nucleus or different nuclei.

In the present invention, the epoxy resin (A1) has at least two glycidyloxy group-containing aromatic groups bonded to each other by a divalent endocyclic hydrocarbon group or an aryl group, and optionally a $C_1$ to $C_6$ alkylene group. This linkage can be any desired combination of linkage forms.

In preferred embodiments, the epoxy resin (A1) has at least two glycidyloxy group-containing aromatic groups bonded to each other by a divalent endocyclic hydrocarbon group. Examples of the divalent endocyclic hydrocarbon group can be represented by structural formulae X1 to X3 as below:

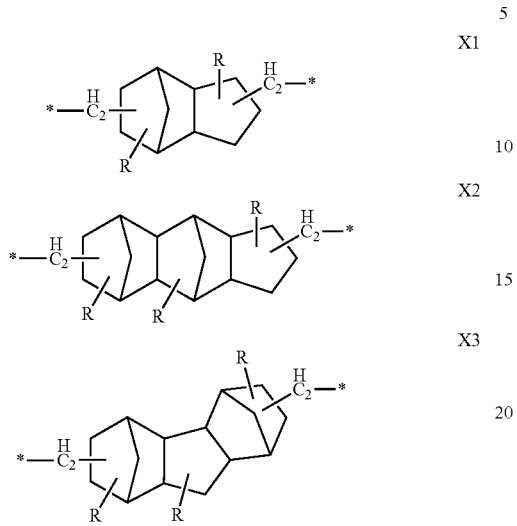

wherein there may be a plural number of R per ring, and R each independently represents a hydrogen atom or a methyl group; and * represents a bonding site linked to the glycidyloxy group-containing aromatic group.

In some embodiments, the epoxy resin (A1) has at least two glycidyloxy group-containing aromatic groups bonded to each other by an aryl group. The term "aryl" herein refers to a polyunsaturated, aromatic, substituent that can be a single ring or multiple rings (preferably from 1 to 3 rings), which are fused together or linked covalently. Examples of the aryl group include but not limited to phenyl, tollyl, xylyl, and 4-biphenyl.

In preferred embodiments, the epoxy resin (A1) has at least two glycidyloxy group-containing aromatic groups bonded to each other by an aryl group and a $C_1$ to $C_6$ alkylene group. Examples of a $C_1$ to $C_6$ alkylene group include —CH$_2$—, —CH$_2$CH$_2$—, —CH$_2$CH$_2$CH$_2$—, —CH(CH$_3$)CH$_2$—, —CH(C$_2$H$_5$)CH$_2$—, —CH$_2$CH$_2$CH$_2$CH$_2$—, —C(CH$_3$)$_2$CH$_2$—, —CH(CH$_3$)CH$_2$CH$_2$—, —CH$_2$CH(CH$_3$)CH$_2$—, —CH(CH$_3$)CH(CH$_3$)—, —CH$_2$CH$_2$CH$_2$CH$_2$CH$_2$—, —CH(CH$_3$)CH$_2$CH$_2$CH$_2$—, —CH$_2$CH$_2$CH(CH$_3$)CH$_2$CH$_2$—, —C(CH$_3$)$_2$CH$_2$CH$_2$—, —CH$_2$C(CH$_3$)$_2$CH$_2$—, —CH(C$_2$H$_5$)CH$_2$CH$_2$—, —CH$_2$CH(C$_2$H$_5$)CH$_2$—, —CH(CH$_3$)CH(CH$_3$)CH$_2$—, —CH$_2$CH$_2$CH$_2$CH$_2$CH$_2$CH$_2$—, —CH(CH$_3$)CH$_2$CH$_2$CH$_2$CH$_2$—, —CH$_2$CH(CH$_3$)CH$_2$CH$_2$CH$_2$—, —CH$_2$CH$_2$CH(CH$_3$)CH$_2$CH$_2$—, —C(CH$_3$)$_2$CH$_2$CH$_2$CH$_2$—, —CH$_2$C(CH$_3$)$_2$CH$_2$CH$_2$—, —CH(CH$_3$)CH(CH$_3$)CH$_2$CH$_2$—, —CH(CH$_3$)CH$_2$CH$_2$CH(CH$_3$)—, —CH$_2$CH(CH$_3$)CH$_2$CH(CH$_3$)—, —CH$_2$CH(CH$_3$)CH(CH$_3$)CH$_2$—, —CH(C$_2$H$_5$)CH$_2$CH$_2$CH$_2$— and —CH$_2$CH(C$_2$H$_5$)CH$_2$CH$_2$—.

Specific examples of the combination of an aryl group and a $C_1$ to $C_6$ alkylene group include but not limited to phenylmethyl group, 2-methylbiphenyl group, 3-methylbiphenyl group, 4-methylbiphenyl group, 2-methylnaphthalene group, 3-methylnaphthalene group, 4-methylnaphthalene group, represented by structural formulae X4 to X9 as below:

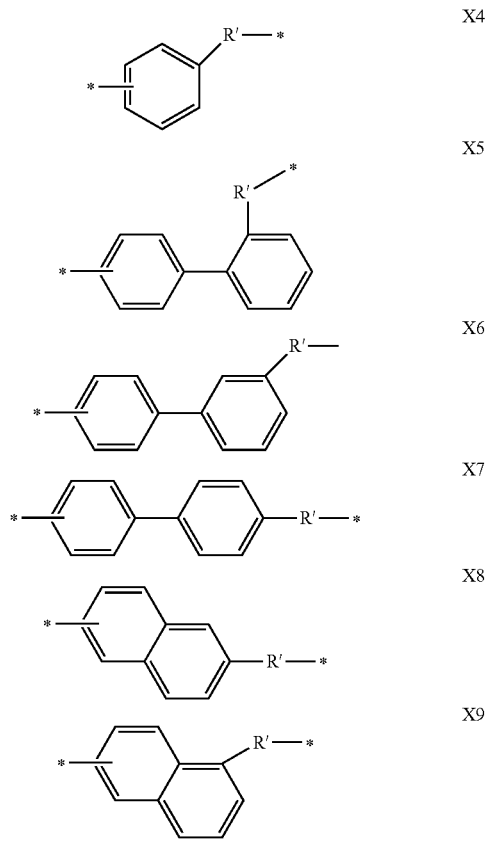

wherein R' each independently represent a $C_1$ to $C_6$ alkylene group, preferably $C_1$ to $C_3$ alkylene group, more preferably methylene group; and * represents a bonding site linked to the glycidyloxy group-containing aromatic group.

Among them, the structure formulae X1 and X7 are particularly preferred from the viewpoint of providing toughness to the cured product of the composition.

In some embodiments, the epoxy resin (A1) can be selected from glycidyloxy group-containing biphenyl type epoxy resins, glycidyloxy group-containing naphthalene type epoxy resins, glycidyloxy group-containing epoxy resin having a divalent endocyclic hydrocarbon group, and combination thereof.

Specific examples of glycidyloxy group-containing biphenyl type epoxy resins used as epoxy resin (A1) in the present invention can be represented by the following structural formulae P1 and P2:

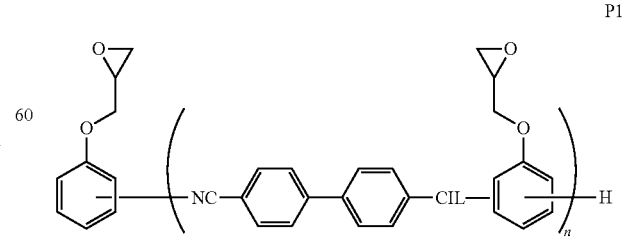

wherein n may be an average from 1 to 5.

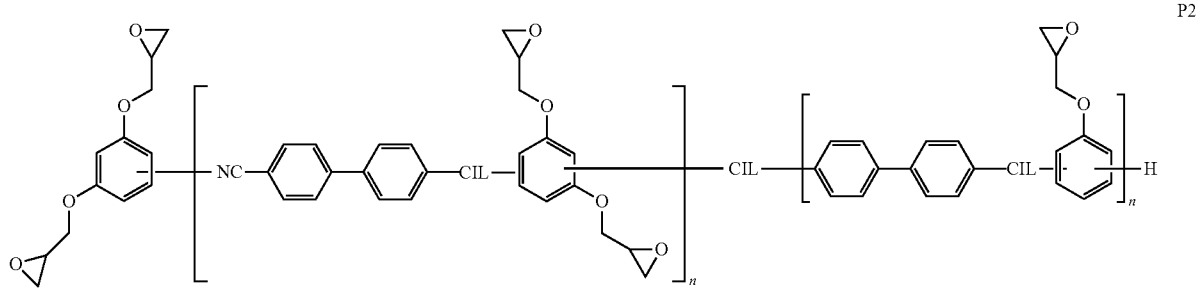

P2 wherein n may be an average from 1 to 5.

Specific example of glycidyloxy group-containing epoxy resin having a divalent endocyclic hydrocarbon group used as epoxy resin (A1) in the present invention can be represented by the following structural formula P3:

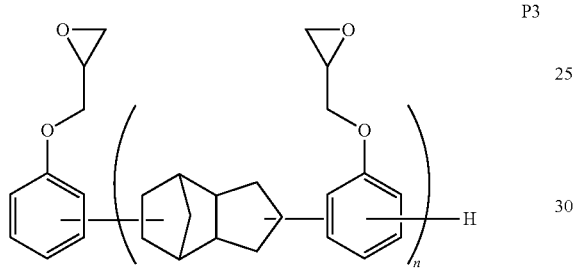

P3 wherein n may be an average from 1 to 5. In this structure, diglycidyl group-containing phenol groups can be bonded to any structural sites positioned on the octahydro-4,7-methano-indene.

Since the present invention has the above-described characteristic chemical structure, the aromatic hydrocarbon structure or endocyclic hydrocarbon structure making it tough and rigid, as a result such resin can provide enhanced toughness whilst maintaining heat durability.

In preferred embodiments, the epoxy resin (A1) preferably has an epoxy equivalent in a range of 180 to 500 g/eq, preferably from 200 to 400 g/eq.

In some embodiments, the epoxy resin (A1) can be produced by a production method by reacting phenol resin with epichlorohydrin, which is known in the art.

Examples of the commercially available epoxy resin (A1) include NC-3000 series (NC-3000 & NC-2000-L) and XD-1000 manufactured by Nippon Kayaku Co., Ltd.

With particular preference, the epoxy resin (A1) incorporated in the conductive epoxy resin composition is present in an amount of from 1 to 15% by weight, preferably from 3 to 10% by weight, based on the total weight of the composition.

(A2) Resorcinol Diglycidyl Ether Resin

According to the present invention, adding certain amount of resorcinol diglycidyl ether resin (A2), i.e. 0.2 to 5.0% by weight, preferably from 0.5 to 3.0% by weight, more preferably 0.75 to 2.25%, based on the total weight of the composition into the epoxy resin (A1) provided in the present invention can dramatically improve adhesion on bonding copper substrate.

Resorcinol diglycidyl ether (RDGE) has good oxygen barrier properties, as well as good chemical resistance, flexibility, and adhesion to a variety of substrates. RDGE-based resins may provide advantageous conformer packing, improved hydrogen bonding, and inter/intra-chain interaction within the resin in comparison to other epoxy resins.

In some embodiments, where the resorcinol diglycidyl ether resin comprises a monomer, the resorcinol exhibits a substantially low viscosity (e.g., between about 200 and about 500 cps at about 25° C.) and a substantially high reactivity with the epoxy resin. The resorcinol diglycidyl ether resin may exhibit an epoxide equivalent weight of between about 100 g and about 130 g. The resorcinol diglycidyl ether epoxy may have the general structure (I) shown below:

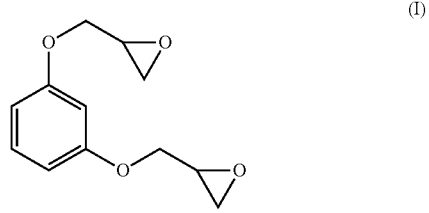 [SMILES: c1cc(OCC2CO2)cc(OCC2CO2)c1]

(I)

An example of the resorcinol diglycidyl ether resin is ERISYS® RDGE, a purified form of RDGE, available from CVC Thermoset Specialties. ERISYS® RDGE has a viscosity of about 300 to 500 cps at 25° C. and maximum 10 ppm residual epichlorohydrin.

With particular preference, the resorcinol diglycidyl ether resin (A2) may be incorporated in the conductive epoxy resin composition is present in an amount of from 0.2 to 5.0% by weight, preferably from 0.5 to 3.0% by weight, more preferably from 0.75 to 2.25% by weight, based on the total weight of the composition.

In preferred embodiments, the weight ratio of resorcinol diglycidyl ether resin (A2) to the epoxy resin (A1) is from 1:4 to 1:20, preferably from 1:5 to 1:15, more preferably from 1:6 to 1:10.

Acid Anhydride Curing Agent

According to the present invention, the conductive epoxy resin composition comprises at least one acid anhydride curing agent (B). The acid anhydride curing agent (B) is not particularly limited insofar as it can cure the component (A).

Specific examples of acid anhydride curing agent include phthalic acid anhydride, maleic acid anhydride, trimellitic acid anhydride, pyromellitic acid anhydride, hexahydrophthalic acid anhydride, tetrahydrophthalic acid anhydride, nadic methyl acid anhydride, nadic acid anhydride, glutaric acid anhydride, methylhexahydrophthalic acid anhydride, and methyltetrahydrophthalic acid anhydride. Such acid anhydrides may be used singly or in combination.

It is preferable to use phthalic acid anhydride, hexahydrophthalic acid anhydride, tetrahydrophthalic acid anhydride, methylhexahydrophthalic acid anhydride, and the like.

The amount of the acid anhydride curing agent (B) to be used is not particularly limited, and it is usually preferable such that the acid anhydride curing agent (B) is in an amount of about 0.5 to 1.5 eq., and more preferably about 0.8 to 1.2 eq., per equivalent of the epoxy resin system (A). When the amount of the component (B) is less than 0.5 eq., the curing of the epoxy resin composition is likely to be not complete, while when it exceeds 1.5 eq., the cured product is likely to be less tough than that of present invention.

With particular preference, the acid anhydride curing agent (B) may be incorporated in the conductive epoxy resin composition in an amount of from 3% to 15% by weight, preferably from 3.5% to 10% by weight, based on the total weight of the composition.

Solvent

In preferred embodiments, the conductive epoxy resin composition may comprise at least one solvent (C) to disperse the epoxy resin system (A) and conductive fillers (D) so as to decrease viscosity of the conductive epoxy resin composition.

Most conductive fillers, silver fillers for example, are provided commercially with a coating of organic substances to prevent agglomeration. The solvent acts to dissolve or displace the organic substances off the surface of the silver filler. The solvent must have a balance of polarity effective to remove the coatings and allow the conductive filler to remain dispersed in the solvent until dispensed and cured. Typical organic substances used by manufactures of silver filler include stearic acid, isosteric acid, lauric acid, decanoic acid, decanoic acid, oleic acid, palmitic acid, or fatty acids neutralized with amines such as imidazoles. And effective solvent is one that will remove these, and other such, lubricants from the surface of the silver filler.

There is no limitation on the type of the solvent as long as it has a flash point of more than 70° C., preferably more than 90° C. The solvent can be selected from the group consisting of 2-(2-ethoxy-ethoxy)-ethyl acetate, propylene glycol monoethyl ether, butylethoxy ethyl acetate, propylene carbonate, cyclooctenone, cycloheptanone, cyclohexanone, linear or branched alkanes, tripropyleneglycol methyl ether, dipropylene glycol monomethyl ether and a mixture thereof.

It is possible to use commercially available products in the present invention. Examples thereof include diisobutyl adipate available from Sinopharm Chemical Reagent Co., Ltd, and 2-(2-butoxyethoxy) ethyl acetate available from BASF, diethylene glycol monoethyl ether available from SIGMA-ALDRICH.

With particular preference, the solvent (C) may be incorporated into the conductive epoxy resin composition in an amount of from 0.5 to 20% by weight, preferably from 1 to 10% by weight, based on the total weight of the composition.

Conductive Filler

The conductive epoxy resin composition according to the present invention comprises at least one conductive filler selected from silver, copper, boron nitride, alumina, gold, nickel, silver-containing alloy, copper-containing alloy, nickel-containing alloy, and combination thereof. From the standpoint of cost, silver, copper, boron nitride or alumina is preferably used as conductive filler in the present invention.

In preferred embodiments, the conductive filler can be silver filler having a $D_{50}$ particle size of from 0.5 to 6.0 μm, preferably from 0.8 to 5.0 μm, more preferably from 1.0 to 5.0 μm, more preferably from 1.1 to 1.4 μm, and even more preferably from 1.1 to 3.0 μm. When the particle size of the silver filler is within the above range, the fillers are better dispersed in the resin composition, which can improve the preservation stability of the resin composition and provide a uniform bonding strength. Herein, the "$D_{50}$ particle size" of the silver filler represents a median diameter in a volume-basis particle size distribution curve obtained by measurement with a laser diffraction particle size analyzer.

In preferred embodiments, the silver particles used in the conductive epoxy resin composition include particles in which the shape is flake. The filler having such a shape has high contact area between the fillers, which may reduce voids in a cured product. The shape of silver particles is a shape when analyzed from scanning electron microscope (SEM) observation, and Philips XL30 can be used as the observation apparatus of SEM. Examples of the flake particles include particles with a shape called tabular, dished, scaly, and flaky. When flake silver particles are brought into contact with each other, the contact area increases compared with the case where granular silver particles are brought into contact with each other. Therefore, if the conductive epoxy resin composition containing flake silver particles is heat-cured, the denseness of silver particles to each other will increase, and as a result, presumably, not only the thermal conductivity and the electrical conductivity of a cured product of the conductive epoxy resin composition, but also adhesive strength to the surface of a base metal is improved.

In preferred embodiments, the conductive filler can be silver filler having a tap density of from 2 to 15 $g/cm^3$, preferably from 3 to 7.5 $g/cm^3$.

In preferred embodiments, the silver fillers used in the present invention can be manufactured by a known method such as a reduction method, a milling method, an electrolysis method, an atomization method, or a heat treatment method.

In some embodiments, the surface of the silver filler may be coated with an organic substance.

Herein, the state where a silver filler is "coated with the organic substance" includes a state where an organic solvent is adhered to the surface of a silver filler by dispersing the silver filler in the organic solvent.

Examples of the organic substance coating the silver filler may include a hydrophilic organic compound such as an alkyl alcohol having 1 to 5 carbon atoms, an alkanethiol having 1 to 5 carbon atoms, and an alkane polyol having 1 to 5 carbon atoms, or a lower fatty acid having 1 to 5 carbon atoms; and a hydrophobic organic compound such as a higher fatty acid having 15 or more carbon atoms and its derivatives, a middle fatty acid having 6 to 14 carbon atoms and its derivatives, an alkyl alcohol having 6 or more carbon atoms, an alkylamine having 16 or more carbon atoms, or an alkanethiol having 6 or more carbon atoms.

Examples of the higher fatty acid include a straight-chain saturated fatty acid such as pentadecanoic acid, hexadecane acid, heptadecanoic acid, octadecanoic acid, 12-hydroxy octadecanoic acid, eicosanoic acid, docosanoic acid, tetracosanoic acid, hexacosanoic acid (cerinic acid), or octacosanoic acid; a branched saturated fatty acid such as 2-pentyl nonanoic acid, 2-hexyl decanoic acid, 2-heptyl dodecanoic acid, or isostearic acid; and an unsaturated fatty acid such as palmitoleic acid, oleic acid, isooleic acid, elaidic acid, linoleic acid, linolenic acid, recinoleic acid, gadoleic acid, erucic acid, and selacholeic acid.

Examples of the middle fatty acid include a straight-chain saturated fatty acid such as hexanoic acid, heptanoic acid, octanoic acid, nonanoic acid, decanoic acid, undecanoic acid, dodecanoic acid, tridecanoic acid, or tetradecanoic acid; a branched saturated fatty acid such as isohexanoic acid, isoheptanoic acid, 2-ethylhexanoic acid, isooctane acid, isononanoic acid, 2-propyl heptanoic acid, isodecanoic acid, isoundecanoic acid, 2-butyl octanoic acid, isododecanoic acid, and isotridecanoic acid; and an unsaturated fatty acid such as 10-undecenoic acid.

Examples of a method for manufacturing a silver filler having a surface coated with an organic substance include, but are not particularly limited to, a method for manufacturing a silver filler in the presence of an organic solvent by a reductive method. Specifically, the silver filler can be obtained by mixing a carboxylic acid silver salt with a primary amine, and depositing a conductive filler using a reducing agent in the presence of an organic solvent.

It is possible to use commercially available silver fillers as conductive fillers in the present invention. Examples thereof include FA-SAB-238 available from Dowa Hightech and EA0295 available from METALOR.

When the surface of the silver filler is coated with the organic substance, the aggregation of the silver filler in the adhesive composition can be more prevented or reduced.

In some embodiments, the silver fillers may be used singly or in combination of two or more. Combination of fillers in different shapes or different sizes may reduce porosity of the cured product. Examples of the combination include, but not limited to, a mixture of a flake-shaped silver filler, and an approximately spherical-shaped silver filler having a central particle diameter smaller than that of the flake-shaped silver filler.

With particular preference, the conductive filler (D) may be incorporated in the conductive epoxy resin composition in an amount of from 65% to 95% by weight, preferably from 70% to 95% by weight, based on the total weight of the composition.

Catalyst

In some embodiments, catalyst may be added to speed up the curing process or reduce the temperature for the thermal latent cure.

Various thermal curing catalyst known in the art can be used in the present invention, including phenyl ureas, boron trichloride amine complexes, imidazoles, aliphatic bis ureas, phenols, resorcinol, and combinations thereof. In preferred embodiment, an effective catalyst for the composition is imidazoles. Imidazoles are a heterocyclic compound which contains a nitrogen atom at the 1,3-positions of a 5-membered ring. Specific examples of imidazole catalyst include 2-methylimidazole, 2-undecylimidazole, 2-heptadecylimidazole, 1,2-dimethylimidazole, 2-phenylimidazole, 2-ethyl-4-methyl imidazole, 2-phenyl-4-methylimidazole, 1-benzyl-2methylimidazole, 1-benzyl-2-phenylimidazole, 2-phenyl-4,5-dihydroxymethylimidazole, 2-phenyl-4-methyl-5-hydroxymethylimidazole, 1-cyanoethyl-2-ethyl-4,5-methylimidazole, 2,4-diamino-6-[2'-methylimidazolyl-(1')]-ethyl-s-triazine, and 2,4-diamino-6-[2'-methylimidazolyl (1')]ethyl-s-triazineisocyanuric acid addition product dehydrate.

Commercial examples of imidazole catalysts are Curezol 2MA-OK or Curezol 2PHZ-S, available from Air Products. A commercial example of latent polyamines is available as HXA 3932HP from AsahiKASEI.

With particular preference, the catalyst (E) may be incorporated into the conductive epoxy resin composition in an amount of from 0.1% to 5% by weight, preferably from 0.5 to 3% by weight, based on the total weight of the composition.

Preferred in accordance with the invention is the conductive epoxy resin composition comprising:
from 1 to 15% by weight, preferably from 3 to 10% by weight of at least one epoxy resin having at least two glycidyloxy group-containing aromatic groups bonded to each other by a divalent endocyclic hydrocarbon group or an aryl group, and optionally a $C_1$ to $C_6$ alkylene group (A1),
from 0.2 to 5.0% by weight, preferably from 0.5 to 3% by weight, more preferably from 0.75 to 2.25% by weight of at least one resorcinol diglycidyl ether resin (A2),
from 3% to 15% by weight, preferably from 3.5% to 10% by weight of at least one acid anhydride curing agent (B);
from 0.5 to 20% by weight, preferably from 1 to 10% by weight of at least one solvent (C);
from 65% to 95% by weight, preferably from 70% to 95% by weight of at least one conductive filler (D); and
from 0.1% to 5% by weight, preferably from 0.5 to 3% by weight of at least one catalyst (E)
based on the total weight of the composition.

Additive

Other commonly used additives may be further added to the conductive epoxy resin composition of the present invention include toughening agent, fluxing agent, peroxide, flow additives, adhesion promoters, rheology modifiers, and mixture thereof.

In some embodiments, the conductive epoxy resin composition may comprise toughening agent to toughen the epoxy resin, for example, liquid butadiene rubber. The said liquid butadiene rubber can have homo- or copolymers containing repeating units derived from butadiene or isobutadiene, or copolymers of butadiene or isobutadiene with acrylates and/or acyrlonitriles, e.g. liquid butadiene acrylonitrile rubbers.

In some embodiments, the liquid butadiene rubber used as toughening agent of the present invention may contain reactive end groups, such as amino-terminated liquid nitrile rubber (ATBN) or carboxylate-terminated liquid acrylonitrile rubber rubber (CTBN) or liquid rubbers containing free epoxy- or methacrylate end-groups.

The addition of a liquid butadiene rubber used as toughening agent in the present invention is believed to improve the mechanical strength of the cured adhesive composition at elevated temperatures, in particular at temperatures of more than 90° C., preferably of more than 180° C. or even more preferably of more than 250° C.

Liquid butadiene rubbers are commercially available, for example under the trade designation of Hycar® from NOVEON.

According to the present invention, the additive may be present in an amount of from 0.1% to 13%, preferably from 0.5% to 3% by weight, based on the total weight of the composition.

Manufacturing Method of Conductive Epoxy Resin Composition

The conductive epoxy resin composition according to the present invention can be manufactured at room temperature by mixing (A1) at least one epoxy resin having at least two glycidyloxy group-containing aromatic groups bonded to each other by a divalent endocyclic hydrocarbon group or an aryl group, and optionally a $C_1$ to $C_6$ alkylene group; (A2) at least one resorcinol diglycidyl ether resin presented in an amount of from 0.2 to 5.0% by weight, based on the total weight of the composition; (B) at least one acid anhydride curing agent; (C) optionally, at least one solvent; (D) at least one conductive filler; (E) optionally, at least one catalyst; and other additives if present. The manufacturing method of the conductive epoxy resin composition is not particularly limited, as long as a composition in which the above-described components are uniformly mixed can be obtained.

Cured Product and Semiconductor Device

In another aspect of the invention, a cured product of the conductive epoxy resin composition according to this invention is provided.

In preferred embodiments, the curing temperature of the conductive epoxy resin composition is from 120° C. to 200° C., preferably is from 150° C. to 180° C.

The conductive epoxy resin composition of the present invention can be used for bonding to a circuit of an electronic component, such as a die attacher which bonds a semiconductor element and another semiconductor element, and/or as a die attacher which bonds a semiconductor element and a support member for mounting the semiconductor element.

In preferred embodiments, the cured product of the conductive epoxy resin composition has a bonding strength of more than 10 MPa at room temperature, and more than 1.3 MPa at 260° C., in which the testing material is bare silicon die and copper-lead frame.

In an additional aspect of the invention, a semiconductor device comprising a cured product of the conductive epoxy resin composition according to the present invention is provided.

A semiconductor device which includes a cured product of the conductive epoxy resin composition according to the present invention is excellent in adhesion strength at a high temperature of 260° C.

In yet another aspect of the invention, the use of the conductive epoxy resin composition and cured product of the conductive epoxy resin composition according to this invention in the manufacturing of semiconductor packages or microelectronic devices is provided.

EXAMPLES

The following examples are intended to assist one skilled in the art to better understand and practice the present invention. The scope of the invention is not limited by the examples but is defined in the appended claims. All parts and percentages are based on weight unless otherwise stated.

Raw Materials:

DDSA is liquid mixture of several isomeric alkenylsuccinic acid anhydrides, available from Milliken Chemicals.

XD-1000 is epoxy resin having at least two glycidyloxy group-containing aromatic groups bonded to each other by a divalent endocyclic hydrocarbon group, available from Nippon.

ERISYS RDGE is resorcinol diglycidyl ether resin, available from CVC Specialties.

jER™ 828US is a bisphenol A, liquid epoxy resin, available from Mitsubishi Chemical.

ZX1059 is bisphenol F-type epoxy resin, available from TOHTO Chemical Industry Co., Ltd.

Ras-1 is epoxy resin containing more than 50% by weight of 2,6-diglycidylphenyl glycidyl ether, available from Henkel.

Epiclon® N-730 is a multifunctional, phenol novolac based epoxy resin, available from DIC Corporation.

Denacol® EX-191P is a low chlorine, monofunctional type aromatic epoxy compound based on glycidyl benzoate, available from Nagase ChemteX.

Araldite® MY 0510 is a triglycidylized para-aminophenol, available from Huntsman.

ERISYS™ GA 240 is a tetrafunctional epoxy resin based on meta-xylenediamine, available from CVC Specialties.

Epalloy™ 5200 is a cycloaliphatic glycidyl ester, available from CVC Specialties.

ERISYS™ GE 22 is an epoxidized cyclohexanedimethanol, available from CVC Specialties.

EPALLOY® 5000 is a diepoxide of cycloapliphatic alcohol, hydrogenated Bisphenol A, available from CVC Specialties.

ERISYS™ GE 60 is an aliphatic multifunctional epoxy resin, available from CVC Specialties.

ERISYST GE 40 is epoxidized pentaerythritol, available from CVC Specialties.

ERISYS™ GE 30 is a low viscosity trimethylolpropane triglycidyl ether grade. It is a high epoxy functional resin, available from CVC Specialties.

CELLOXIDE 2021P is cycloaliphatic epoxide, available from DAICEL CORPORATION.

CELLOXIDE 2081 is a cycloaliphatic epoxide, available from DAICEL CORPORATION.

ETERNACOLL® OXBP is biphenyl bisoxetane, available from UBE INDUSTRIES, LTD.

2-(2-Butoxyethoxy)ethyl acetate is available from SIGMA-ALDRICH.

HYCAR® CTBN 1300X8 is a carboxyl terminated butadiene-acrylonitrile copolymer used as toughening agent, available from NOVEON.

2MAOK is imidazoles catalyst, available from Air Products.

EA0295 is silver filler, available from METALOR.

Silquest® A-186 is adhesion promotor from GE Silicones.

jER Cure® YH307 is modified acid anhydride, available from Milliken Chemicals.

Epiclon B-570-H is 3-methyl-tetrahydro-phthalic anhydride, available from DIC Europe GmbH.

RIKACID MH700 is 4-methylhexahydrophthalic anhydride, available from New Japan Chemical Co., Ltd.

NC-3000-L is a glycidyloxy group-containing biphenyl type epoxy resin, available from Nippon.

NC-3500 is a glycidyloxy group-containing biphenyl type epoxy resins, available from Nippon.

HXA 3932HP is latent hardener, available from AsahiKASEI.

Preparation Method:

In the following examples, the compositions were prepared by the following steps:
1. the epoxy resin (A1) and RDGE (A2) (or other epoxy resin replacing with RDGE in the comparative examples), solvent (C) (if present) and adhesion promotor (if present) were firstly mixed at 60° C. for 1 hour and then were further mixed at 2000 r/min for 2 minutes at room temperature by using a speed mixer;
2. catalyst (E) (if present) was then added in and mixed using speed mixer at 2000 r/min for 2 minutes;
3. adding toughening agent (if present) and mixed by using speed mixer at 2000 r/min for 2 minutes;
4. adding acid anhydride (B) and mixed using speed mixer at 2000 r/min for 2 minutes; and 5. adding conductive filler (D) and mixed using speed mixer at 1000 r/min for 2 minutes, then degassing.

Test Methods

Die Shear Strength:

Die Shear Strength for room temperature (RTDSS) was measured using DAGE4000 at 25° C. The compositions were coated onto 2×2 mm² bare silicone dies and employed to a commercial type of copper lead-frame (CDA151) used in the semiconductor industry. The samples were cured at 5° C./min to 175° C. for 1 hour at $N_2$ atmosphere. No pressure was used. Each sample was tested eight times under the same condition and the average die shear strength was calculated and recorded by simplistic average method so as to eliminate error. The average RTDSS target was greater than or equal to 10 Kg/mm².

Die Shear Strength for high temperature (HTDSS) was measured using DAGE4000 at 260° C. with a heater adapter plate capable of reaching 260° C. The compositions were coated onto 2×2 mm² bare silicone dies and employed to a commercial type of copper lead-frame (CDA151) used in the semiconductor industry. The samples were cured at 5° C./min to 175° C. for 1 hour at $N_2$ atmosphere. No pressure was used. Each sample was tested eight times under the same condition and the average die shear strength was calculated and recorded by simplistic average method so as to eliminate error. The average HTDSS target was greater than or equal to 1.3 Kg/mm².

Inventive Example 1 and Comparative Examples 1 to 16

In this set of examples, one conductive epoxy resin composition comprising RDGE according to this invention (Ex.1) and 16 compositions replacing RDGE with other epoxy resins (Com. Ex.1 to Com. Ex.16) were prepared based on weight percentage specified in the following table. The RTDSS and HTDSS of the samples were tested.

TABLE 1a

| Components | EX. 1 | Com. Ex. 1 | Com. Ex. 2 | Com. Ex. 3 | Com. Ex. 4 | Com. Ex. 5 | Com. Ex. 6 | Com. Ex. 7 | Com. Ex. 8 | Com. Ex. 9 |
|---|---|---|---|---|---|---|---|---|---|---|
| DDSA | 9.37 | 9.37 | 9.37 | 9.37 | 9.37 | 9.37 | 9.37 | 9.37 | 9.37 | 9.37 |
| XD-1000 | 7.62 | 7.62 | 7.62 | 7.62 | 7.62 | 7.62 | 7.62 | 7.62 | 7.62 | 7.62 |
| ERISYS RDGE | 1.25 | — | — | — | — | — | — | — | — | — |
| jER ™ 828US | — | 1.25 | — | — | — | — | — | — | — | — |
| ZX1059 | — | — | 1.25 | — | — | — | — | — | — | — |
| Ras-1 | — | — | — | 1.25 | — | — | — | — | — | — |
| Epiclon ® N-730 | — | — | — | — | 1.25 | — | — | — | — | — |
| Denacol ® EX-191P | — | — | — | — | — | 1.25 | — | — | — | — |
| Araldite ® MY 0510 | — | — | — | — | — | — | 1.25 | — | — | — |
| ERISYS ™ GA 240 | — | — | — | — | — | — | — | 1.25 | — | — |
| Epalloy ™ 5200 | — | — | — | — | — | — | — | — | 1.25 | — |
| ERISYS ™ GE 22 | — | — | — | — | — | — | — | — | — | 1.25 |
| EPALLOY ® 5000 | — | — | — | — | — | — | — | — | — | — |
| ERISYS ™ GE 60 | — | — | — | — | — | — | — | — | — | — |
| ERISYS ™ GE 40 | — | — | — | — | — | — | — | — | — | — |
| ERISYS ™ GE 30 | — | — | — | — | — | — | — | — | — | — |
| CELLOXIDE 2021P | — | — | — | — | — | — | — | — | — | — |
| CELLOXIDE 2081 | — | — | — | — | — | — | — | — | — | — |
| ETERNACOLL ® OXBP | — | — | — | — | — | — | — | — | — | — |
| 2-(2-Butoxyethoxy)ethyl acetate | 2.14 | 2.14 | 2.14 | 2.14 | 2.14 | 2.14 | 2.14 | 2.14 | 2.14 | 2.14 |
| HYCAR CTBN 1300X8 | 1.87 | 1.87 | 1.87 | 1.87 | 1.87 | 1.87 | 1.87 | 1.87 | 1.87 | 1.87 |
| 2MAOK | 1.75 | 1.75 | 1.75 | 1.75 | 1.75 | 1.75 | 1.75 | 1.75 | 1.75 | 1.75 |
| EA0295 | 75.0 | 75.0 | 75.0 | 75.0 | 75.0 | 75.0 | 75.0 | 75.0 | 75.0 | 75.0 |
| SILQUEST ® A-186 | 1.00 | 1.00 | 1.00 | 1.00 | 1.00 | 1.00 | 1.00 | 1.00 | 1.00 | 1.00 |
| Testing result | | | | | | | | | | |
| RTDSS Kg/mm² | 14.5 | 8 | 7.5 | 7.2 | 12.2 | 5.8 | 8.9 | 10.2 | 6.2 | 10.2 |
| HTDSS Kg/mm² | 2.2 | 0.7 | 0.8 | 0.8 | 0.9 | 0.5 | 0.7 | 0.8 | 0.6 | 0.8 |

TABLE 1b

| Components | Com. Ex. 10 | Com. Ex. 11 | Com. Ex. 12 | Com. Ex. 13 | Com. Ex. 14 | Com. Ex. 15 | Com. Ex. 16 |
|---|---|---|---|---|---|---|---|
| DDSA | 9.37 | 9.37 | 9.37 | 9.37 | 9.37 | 9.37 | 9.37 |
| XD-1000 | 7.62 | 7.62 | 7.62 | 7.62 | 7.62 | 7.62 | 7.62 |
| ERISYS RDGE | — | — | — | — | — | — | — |
| jER ™ 828US | — | — | — | — | — | — | — |
| ZX1059 | — | — | — | — | — | — | — |
| Ras-1 | — | — | — | — | — | — | — |
| Epiclon ® N-730 | — | — | — | — | — | — | — |
| Denacol ® EX-191P | — | — | — | — | — | — | — |
| Araldite ® MY 0510 | — | — | — | — | — | — | — |
| ERISYS ™ GA 240 | — | — | — | — | — | — | — |
| Epalloy ™ 5200 | — | — | — | — | — | — | — |

TABLE 1b-continued

| Components | Com. Ex. 10 | Com. Ex. 11 | Com. Ex. 12 | Com. Ex. 13 | Com. Ex. 14 | Com. Ex. 15 | Com. Ex. 16 |
|---|---|---|---|---|---|---|---|
| ERISYS ™ GE 22 | — | — | — | — | — | — | — |
| EPALLOY ® 5000 | 1.25 | — | — | — | — | — | — |
| ERISYS ™ GE 60 | — | 1.25 | — | — | — | — | — |
| ERISYS ™ GE 40 | — | — | 1.25 | — | — | — | — |
| ERISYS ™ GE 30 | — | — | — | 1.25 | — | — | — |
| CELLOXIDE 2021P | — | — | — | — | 1.25 | — | — |
| CELLOXIDE 2081 | — | — | — | — | — | 1.25 | — |
| ETERNACOLL ® OXBP | — | — | — | — | — | — | 1.25 |
| 2-(2-Butoxyethoxy)ethyl acetate | 2.14 | 2.14 | 2.14 | 2.14 | 2.14 | 2.14 | 2.14 |
| HYCAR CTBN 1300X8 | 1.87 | 1.87 | 1.87 | 1.87 | 1.87 | 1.87 | 1.87 |
| 2MAOK | 1.75 | 1.75 | 1.75 | 1.75 | 1.75 | 1.75 | 1.75 |
| EA0295 | 75.0 | 75.0 | 75.0 | 75.0 | 75.0 | 75.0 | 75.0 |
| SILQUEST ® A-186 | 1.00 | 1.00 | 1.00 | 1.00 | 1.00 | 1.00 | 1.00 |
| Testing result | | | | | | | |
| RTDSS Kg/mm² | 6.8 | 9.8 | 8.7 | 5.4 | 7.7 | 7.3 | 6.8 |
| HTDSS Kg/mm² | 0.7 | 0.6 | 0.5 | 0.4 | 0.9 | 0.7 | 0.4 |

Table 1 showed a higher average die shear strength at both room temperature and high temperature on copper leadframe for the compositions containing RDGE than that of any composition containing other epoxy resins.

Inventive Examples 2 to 4 and Comparative Examples 17 and 18

In this set of examples, the conductive epoxy resin composition with epoxy resin (A1) of the present invention (EX.2 to EX.4) and other epoxy resin (Com. Ex.17 to 18) were prepared based on weight percentage specified in the flowing table. The RTDSS and HTDSS of the samples were tested.

TABLE 2

| Components | Ex. 2 | Ex. 3 | Ex. 4 | Com. Ex. 17 | Com. Ex. 18 |
|---|---|---|---|---|---|
| DDSA | 9.37 | 9.37 | 9.37 | 9.37 | 9.37 |
| XD-1000 | 7.62 | — | — | — | — |
| NC-3000-L | — | 8.22 | — | — | — |
| NC-3500 | — | — | 6.72 | — | — |
| ERISYS ™ GE 30 | — | — | — | 4.57 | — |
| Epicion ® N-730 | — | — | — | — | 5.33 |
| RDGE | 1.25 | 1.25 | 1.25 | 1.25 | 1.25 |
| 2-(2-Butoxyethoxy)ethyl acetate | 2.14 | 2.14 | 2.14 | 1.00 | 4.43 |
| HYCAR ® CTBN 1300X8 | 1.87 | 1.87 | 1.87 | 1.87 | 1.87 |
| 2MA-OK | 1.75 | — | — | 1.75 | 1.75 |
| HXA 3932HP | — | 1.75 | 1.75 | — | — |
| EA0295 | 75.00 | 74.40 | 75.90 | 79.19 | 75.00 |
| SILQUEST® A-186 | 1.00 | 1.00 | 1.00 | 1.00 | 1.00 |
| Testing result | | | | | |
| RTDSS Kg/mm² | 14.5 | 15 | 15.5 | 8 | 12 |
| HTDSS Kg/mm² | 2.2 | 1.6 | 1.8 | 0.3 | 1.1 |

The results in Table 2 showed that a combination of RDGE and epoxy resin (A1) according to the present invention can improve both RTDSS and HTDSS, while adding RDGE into epoxy resin other than A1 is not effective in improving RTDSS or HTDSS.

Inventive Examples 5 to 8

In this set of examples, the conductive epoxy resin composition with different content of RDGE of the present invention (EX.5 to EX.8) were prepared based on weight percentage specified in the following table. The RTDSS and HTDSS of the samples were tested.

TABLE 3

| Components | Ex. 5 | Ex. 6 | Ex. 7 | Ex. 8 |
|---|---|---|---|---|
| DDSA | 9.37 | 8.58 | 10.28 | 11.18 |
| XD-1000 | 7.62 | 7.62 | 7.62 | 7.62 |
| ERISYS RDGE | 1.25 | 0.75 | 1.75 | 2.25 |
| 2-(2-Butoxyethoxy)ethyl acetate | 2.14 | 2.14 | 2.14 | 2.14 |
| HYCAR ®CTBN 1300X8 | 1.87 | 1.87 | 1.87 | 1.87 |
| 2MAOK | 1.75 | 1.75 | 1.75 | 1.75 |
| EA0295 | 75.00 | 76.30 | 73.60 | 72.20 |
| SILQUEST ® A-186 | 1.00 | 1.00 | 1.00 | 1.00 |
| Testing Results | | | | |
| RTDSS Kg/mm² | 14.5 | 10.8 | 13.5 | 11 |
| HTDSS Kg/mm² | 2.2 | 1.6 | 2.3 | 2 |

The results in Table 3 showed that containing certain amount of RDGE according to the present invention can Improve both RTDSS and HTDSS.

Inventive Examples 9 to 12

In this set of examples, the conductive epoxy resin compositions using different acid anhydride curing agents of the present invention (EX.9 to Ex. 12) were prepared based on weight percentage specified in the following table. The RTDSS and HTDSS of the samples were tested.

TABLE 4

| Components | Ex. 9 | Ex. 10 | Ex. 11 | Ex. 12 |
|---|---|---|---|---|
| DDSA | 9.37 | — | — | — |
| jER Cure ®YH307 | — | 7.44 | — | — |
| Epicion B-570-H | — | — | 7.75 | — |
| RIKACID MH700 | — | — | — | 7.75 |
| XD-1000 | 7.62 | 7.30 | 7.24 | 7.24 |
| ERISYS RDGE | 1.25 | 1.34 | 1.34 | 1.34 |
| 2-(2-Butoxyethoxy)ethyl acetate | 2.14 | 2.30 | 2.30 | 2.30 |
| HYCAR ® CTBN 1300X8 | 1.87 | 1.82 | 1.82 | 1.82 |

TABLE 4-continued

| Components | Ex. 9 | Ex. 10 | Ex. 11 | Ex. 12 |
|---|---|---|---|---|
| 2MAOK | 1.75 | 1.88 | 1.88 | 1.88 |
| EA0295 | 75.00 | 76.85 | 76.60 | 76.60 |
| SILQUEST ® A-186 | 1.00 | 1.07 | 1.07 | 1.07 |
| Testing Result | | | | |
| RTDSS Kg/mm$^2$ | 14.5 | 12.5 | 15.6 | 15 |
| HTDSS Kg/mm$^2$ | 2.2 | 1.8 | 2 | 2.1 |

The above results in Table 4 showed that there is no limitation for the type of acid anhydrite curing agent according to the present invention.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A conductive epoxy resin composition comprising:
   (A) at least one epoxy resin system comprising,
      (A1) at least one epoxy resin having at least two glycidyloxy group-containing aromatic groups bonded to each other by a divalent endocyclic hydrocarbon group or an aryl group, and optionally a C1 to C6 alkylene group; and
      (A2) at least one resorcinol diglycidyl ether resin present in an amount of from 0.2 to 5.0% by weight, based on the total weight of the composition;
   (B) at least one acid anhydride curing agent;
   (C) optionally, at least one solvent;
   (D) at least one conductive filler; and
   (E) optionally, at least one catalyst.

2. The composition according to claim 1, wherein the glycidyloxy group-containing aromatic group is selected from monofunctional glycidyloxy group-containing phenol, multifunctional glycidyloxy group-containing phenol, monofunctional glycidyloxy group-containing naphthalene group, multifunctional glycidyloxy group-containing naphthalene group, and combinations thereof.

3. The composition according to claim 1, wherein the epoxy resin (A1) is selected from glycidyloxy group-containing biphenyl type epoxy resins, glycidyloxy group-containing naphthalene type epoxy resins, glycidyloxy group-containing epoxy resin having a divalent endocyclic hydrocarbon group, and combinations thereof.

4. The composition according to claim 1, wherein the resorcinol diglycidyl ether resin (A2) is present in an amount of from 0.5 to 3.0% by weight based on the total weight of the composition.

5. The composition according to claim 1, wherein the acid anhydride curing agent (B) is selected from phthalic acid anhydride, maleic acid anhydride, trimellitic acid anhydride, pyromellitic acid anhydride, hexahydrophthalic acid anhydride, tetrahydrophthalic acid anhydride, nadic methyl acid anhydride, nadic acid anhydride, glutaric acid anhydride, methylhexahydrophthalic acid anhydride, methyltetrahydrophthalic acid anhydride, and combinations thereof.

6. The composition according to claim 1, wherein the conductive filler (D) is selected from silver, copper, boron nitride, alumina, gold, nickel, silver-containing alloy, copper-containing alloy, nickel-containing alloy, and combinations thereof.

7. The composition according to claim 1, wherein the catalyst (E) is selected from phenyl ureas, boron trichloride amine complexes, imidazoles, aliphatic bis ureas, phenols, resorcinol, and combinations thereof.

8. The composition according to claim 1, wherein the composition further comprises additives selected from toughening agents, fluxing agents, peroxides, flow additives, adhesion promoters, rheology modifiers, and combinations thereof.

9. The composition according to claim 1, wherein the component (A1) is present in an amount of from 1 to 15% by weight based on the total weight of the composition.

10. The composition according to claim 1, wherein the component (B) is present in an amount of from 3% to 15% by weight based on the total weight of the composition.

11. The composition according to claim 1, wherein the component (C) in an amount of from 0.5 to 20% by weight based on the total weight of the composition.

12. The composition according to claim 1, wherein the component (D) is present in an amount of from 65% to 95% by weight based on the total weight of the composition.

13. The composition according to claim 1, wherein the composition does not include a bisphenol epoxy resin.

14. A cured product of the conductive epoxy resin composition according to claim 1.

15. A semiconductor device comprising a cured product of the conductive epoxy resin composition according to claim 14.

16. A conductive epoxy resin composition consisting of:
   (A) at least one epoxy resin system comprising,
      (A1) at least one epoxy resin having at least two glycidyloxy group-containing aromatic groups bonded to each other by a divalent endocyclic hydrocarbon group or an aryl group, and optionally a C1 to C6 alkylene group; and
      (A2) at least one resorcinol diglycidyl ether resin present in an amount of from 0.2 to 5.0% by weight, based on the total weight of the composition;
   (B) at least one acid anhydride curing agent;
   (C) optionally, at least one solvent;
   (D) at least one conductive filler;
   (E) optionally, at least one catalyst; and
   (F) optionally, a toughening agent, a fluxing agent, a peroxide, a flow additive, an adhesion promoter, a rheology modifier, or any combination thereof.

* * * * *